United States Patent [19]

Brooks

[11] Patent Number: 4,543,616
[45] Date of Patent: Sep. 24, 1985

[54] VIDEO RECORDING AND DISPLAY EQUIPMENT

[75] Inventor: David Brooks, Enfield, England

[73] Assignee: Thorn EMI Ferguson Limited, London, England

[21] Appl. No.: 375,315

[22] Filed: May 5, 1982

[30] Foreign Application Priority Data

May 7, 1981 [GB] United Kingdom ............... 8114014
Jun. 26, 1981 [GB] United Kingdom ............... 8119860

[51] Int. Cl.⁴ ............................................. H04N 5/92
[52] U.S. Cl. ................................................. 358/335
[58] Field of Search ............... 358/142, 146, 147, 335; 360/9.1, 33.1

[56] References Cited

U.S. PATENT DOCUMENTS

| | | | |
|---|---|---|---|
| 3,493,674 | 2/1970 | Houghton | 358/147 |
| 3,860,745 | 1/1975 | Takada | 358/142 |
| 3,900,887 | 8/1975 | Soga et al. | 358/142 |
| 3,947,870 | 3/1976 | Yumde et al. | 358/147 |
| 3,969,581 | 7/1976 | Watatani et al. | 358/147 |
| 3,996,583 | 12/1976 | Hutt et al. | 358/147 |
| 4,099,258 | 7/1978 | Parsons | 358/147 |
| 4,308,558 | 12/1981 | Hernandez et al. | 358/146 |
| 4,335,402 | 6/1982 | Holmes | 358/147 |
| 4,380,027 | 4/1983 | Leventer et al. | 358/147 |

*Primary Examiner*—Donald McElheny, Jr.
*Attorney, Agent, or Firm*—Fleit, Jacobson, Cohn & Price

[57] ABSTRACT

In the recording of broadcast television text, the text is separated from the video signal and formed into blocks at slicer and then is fed into shift register. It is then taken out at a data rate lower than that when broadcast and coding is assigned to at least some of the blocks prior to recording onto a video cassette tape recorder. Retrieval and display incorporate similar functions in reverse order. In another embodiment data in block form is stored on a video disk for similar retrieval and display.

7 Claims, 3 Drawing Figures

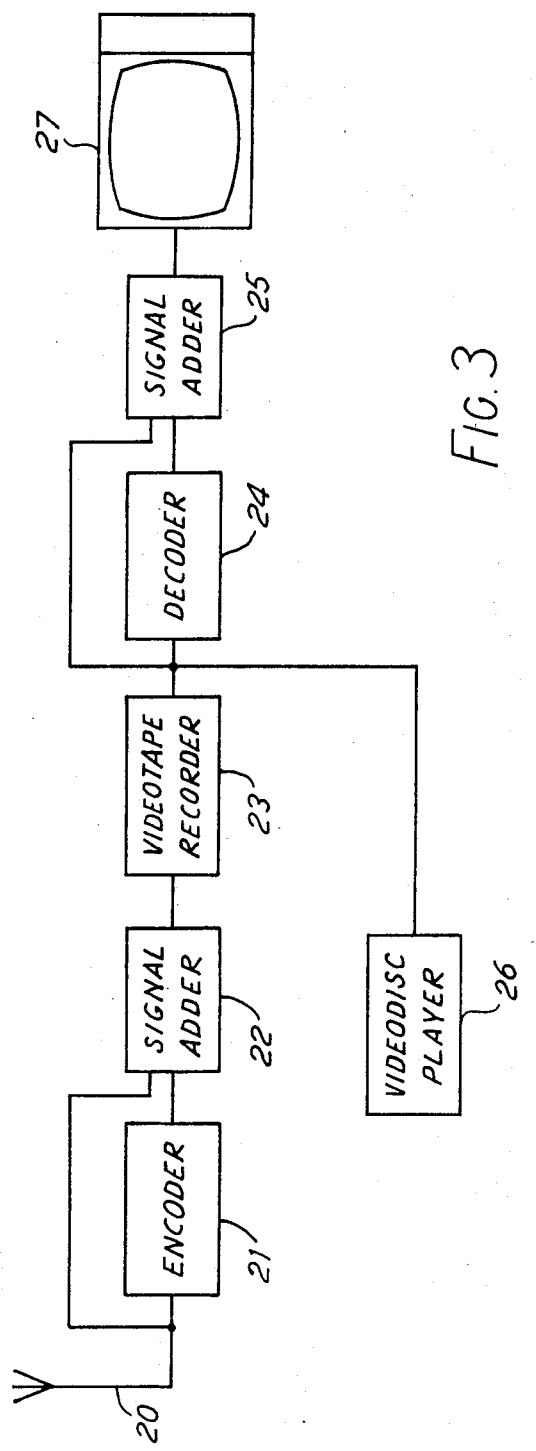

VIDEO RECORDING AND DISPLAY EQUIPMENT

FIELD OF THE INVENTION

The present invention relates to video recording and display, and more particularly to the handling of digital data transmitted in a television signal additional to the television programme information carried by the same signal.

In the television broadcast system presently used within the United Kingdom, additional information consisting of digitally coded signals (known as teletext data) is inserted into the otherwise unused parts of a television signal; these parts consist of one or more of the lines preceding those lines containing video information in each frame of the scan. While the invention is hereafter described with reference to teletext data, it is not limited to use solely with the television system within the United Kingdom, but can be applicable to any television system in which additional information of digital format is inserted within the signals of the standard video information.

DESCRIPTION OF THE PRIOR ART

British Patent Specification No. 1478695 discloses the recording of broadcast teletext signals onto an audio frequency recorder (or similar recorder) by reducing the data digit rate of the broadcast teletext signal from about 4 MHz to about 7 KHz (a reduction by a factor of about six hundred) and then recording all the data relating to a row of teletext information as a continuous stream of data bits. However, only part of the broadcast teletext information can be recorded and reproduced and this part must be selected prior to recording. Moreover the recent increase in the number of teletext lines per field broadcast in the United Kingdom (namely from two to four lines per field) results in a doubling of the time required for storing the teletext information on the recorder; it is possible that there will be further increase in the number of lines broadcast per field.

An object of the invention is to provide equipment permitting the display of video recordings containing both standard video signals and teletext data.

SUMMARY OF THE INVENTION

The present invention provides video recording equipment comprising:
  means to receive a composite signal having standard video information and teletext data, the teletext data occupying a predetermined number A of television line periods in the field blanking period of the standard video information;
  a signal encoder;
  means in the encoder, to separate out teletext data from a received composite signal;
  means, in the encoder, to reduce the rate of the teletext data from its value at the reception means;
  mixing means, in the encoder, to insert the reduced rate teletext data in a number, corresponding to N×A (where N>1), of line periods in the field blanking period of the standard video information;
  means to record the combined signal output from the mixing means.

The present invention also provides video display equipment comprising:
  means to derive, from a recording, a combined signal having standard video information and teletext data, the teletext data occupying a predetermined number A of television line periods in the field blanking period of the standard video information and the teletext data being at a rate reduced in comparison to the rate of broadcast-teletext;
  a signal decoder;
  means, in the decoder, to separate out the teletext data from the combined signal;
  means, in the decoder, to increase the rate of the teletext data to a value substantially corresponding to that of broadcast-teletext;
  mixing means, in the decoder, to insert the output from the rate-increasing means in a number, corresponding to N×A (where N>1), of line periods in the field blanking period of the standard video information, thereby to form a composite signal; and
  means to display the composite signal.

In one form of the invention, the video equipment may be a video disc player for use with a video disc containing, inter alia, video data and teletext data; preferably all the signals are recorded onto the video disc during its manufacture, but some may be recorded thereon later.

Alternatively the video equipment may be a video tape cassette recorder for use with a pre-recorded (whether commercially or privately) tape.

Thus broadcast teletext information with television pictures (e.g. when teletext is used for providing foreign language sub-titles or captions for the deaf) can be recorded onto video cassette tape for subsequent replaying.

The rate-reducing means may include a first-in/first-out data store with a clock-in inhibit control; also the rate-increasing means may include a first-in/first-out data store with an output-rate control.

Also the ratio of data rate during storage to the line frequency during display is preferably integral, thereby providing "jitter-free" locking onto the clock at the lower data rate. Preferably the storage means has a data rate capacity of least 1 MHz so that the change in data rate is by a factor not greater than 6, as there are a limited number of vacant lines in the field blanking period on a video tape recorder or disc player; taking all these constraints into account, it is particularly advantageous for the change in data rate to be by a factor of 3 with current machines.

The data held in the information store may relate to any suitable telesoftware, for example any one or more of the following: script and/or images to be displayed either alone or simultaneously with other television images derived from the standard, non-teletext, circuitry; computer programming software relating to video games; textual data for the information store itself. In the last-mentioned situation computer software could be sent to peripheral microprocessors or a mainframe computer to allow interaction between the displayed information and the user; thus, for example, in an interactive learning process the sequence of information presented to the pupil is dependent on his progress in answering questions on the recently presented material.

BRIEF DESCRIPTION OF THE DRAWING

The invention will be further described, by way of example only, with reference to the accompanying drawings in which:
FIG. 3 is a block diagram of video equipment embodying the present invention.

DESCRIPTION OF THE PREFERRED EMBODIMENT

Figure 1:
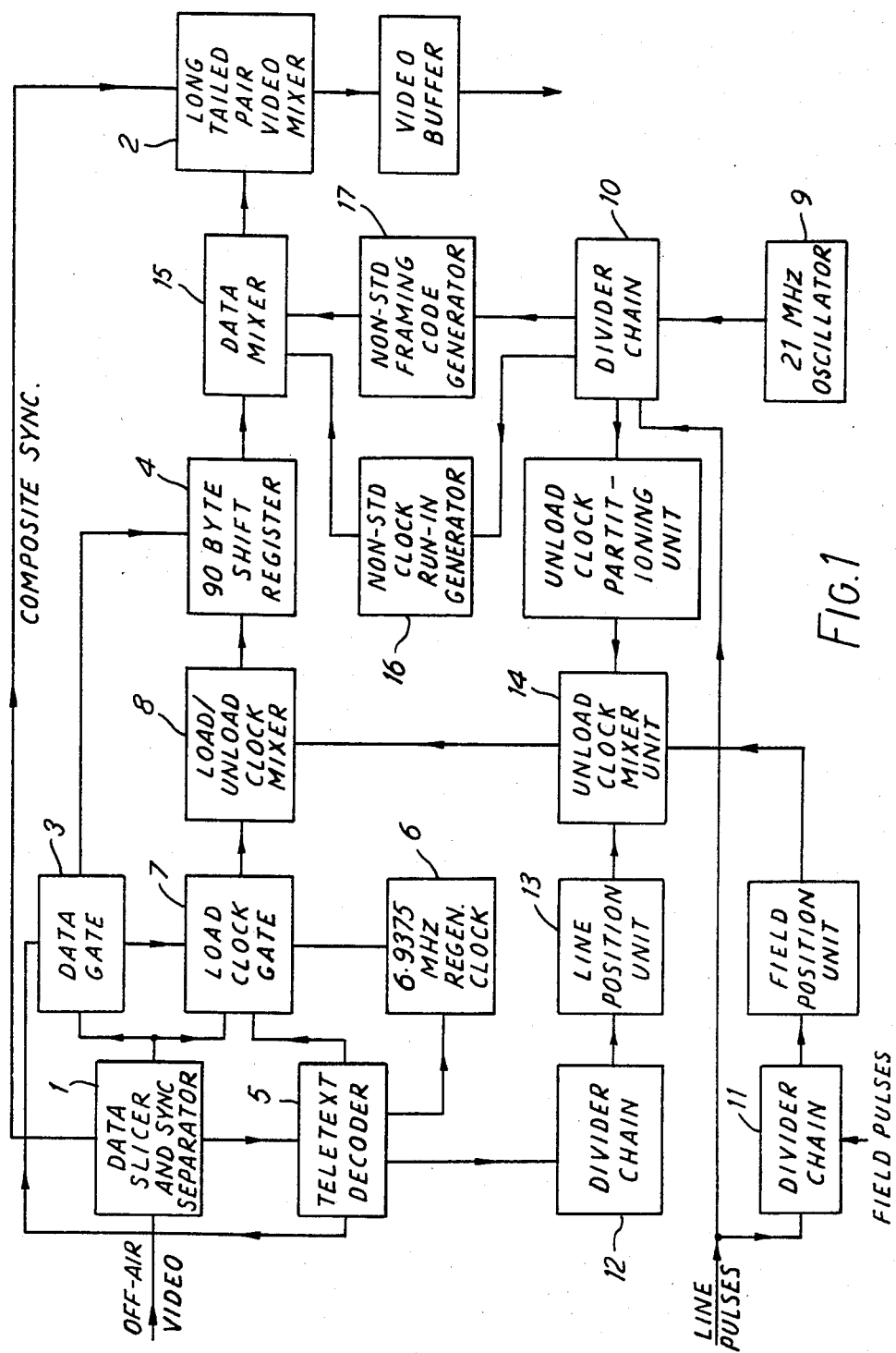
FIG. 1 is a block diagram of a data encoder.

Equipment embodying the present invention is shown in FIG. 3. The equipment has an aerial 20, an encoder 21 substantially as described hereafter with reference to FIG. 1, a signal mixer 22, a video tape recorder 23, a decoder 24 substantially as described hereafter with reference to FIG. 2, a signal mixer 25, a videodisc player 26 and a television receiver 27.

The invention will be described as applied to the recording of teletext on a domestic video tape recorder (V.T.R.). In the teletext systems in use in the United Kingdom, coded digital information is transmitted during selected line periods during the field blanking period of the composite video signal. At present two line periods are used, lines 17 and 18 in one field and 330 and 331 in the other. The data transmitted during each of these line periods comprises 45×8 bit bytes viz. two clock run-in bytes, one framing code byte, two address bytes and 40 character bytes. The data is therefore transmitted at a rate of 6.9375 Mbits per second, which far exceeds the bandwidth capability of a V.T.R. In order to record teletext data on a V.T.R. it is therefore necessary to reduce the bit rate to below, say, 3 Mbits per second and at this reduced bit rate more than two line periods are required to record 45 bytes. In practice it is necessary to record clock run-in and framing code bytes at the beginning of each line period. Therefore to record a teletext row over three line periods requires 51 bytes i.e. 17 bytes per line period and a suitable bit rate is 2.625 M bits per second. This data rate is chosen to be an integral multiple (168) of the television line frequency and an integral sub-multiple (⅓rd) of the original data rate. This ensures a jitter-free lock to line of any waveform divided from the data clock.

Referring to FIG. 1, the off-air video, comprising video plus teletext, is applied to a data slicer and synch separator 1. The composite line and frame synch from 1 is applied to a long-tailed pair video mixer 2, to be described later, while the data plus video is applied via a data gate 3 which inhibits the video and passes the data to a first-in/first-out store being a 90 byte i.e. 720 bit serial shift register 4. The off-air video is applied via 1 to a conventional teletext decoder 5 which recovers the 6.9375 MHz clock from the data and applies it to a load clock gate 7 via a clock regenerator 6. In response to gating pulses from 1 and 5, gate 7 passes clock pulses from 6 to shift register 4 via load/unload clock mixer 8 during lines 17 and 18 of the television signal i.e. during line 17 gate 7 is open and the clock pulses from 6 clock the 45 data bytes from gate 3 into the shift register 4. Gate 7 is then closed during the line flyback period then opened again for the duration of line 18 to allow another 45 bytes to be clocked into shift register 4. In order to record the stored 90 bytes on tape it is necessary to read data from the register at the reduced bit rate of 2.625 MHz and to segment it so that it can be recorded during six line periods, for example lines 8 to 13 of the next field blanking period i.e. lines 320 to 325. The read-out clock is derived from a 21 MHz oscillator 9, synchronized by line pulses, divided down by divider chain 10 to provide 2.625 MHz clock pulses. A second divider chain 11 is reset by field pulses and divides line pulses to produce a gating pulse during lines 320 to 325. Although the duration a television line is 52 μs, the teletext display is active for only 40 μs to allow a margin at each edge of the page and it is preferable to record the teletext data during the same part of the line period. To this end appropriate gating pulses are derived from the 6 MHz display oscillator of the teletext decoder 5 via a divider chain 12 and line position logic 13 and applied to unload clock logic mixer 14 together with the gating pulses from divider chain 11 and the clock pulses from divider chain 10. The unload sequence of shift register 4 is as follows. During line 320, 136 clock pulses from divider chain 10 are gated to the load unload clock mixer 8 and applied to the shift register 4 to clock out the first 17 bytes viz. the clock run-in bytes, forming code byte, address bytes and 12 character bytes, at a bit rate of 2.625 MHz. The clocked out data is applied via a data mixer 15 to the mixer 2. In line 321 mixer 14 is initially inhibited for 24 clock periods and during this time two clock run-in bytes and a framing code byte are produced in turn by generators 16 and 17 respectively in response to clock pulses from divider 10. Mixer 14 is then enabled for 112 clock periods to clock the next 14 bytes viz bytes 18 to 31 from register 4 to mixer 15. Similarly during line 322 clock run-in and address bytes are generated and bytes 32 to 45 clocked out the register. The output from data adder 15 is combined with the composite synch in the long tailed pair video adder 2 and is then added to the original video signals and applied to the video recorder. In this way the 45 bytes broadcast in line 17 are recorded as 51 bytes, 17 in each of lines 320, 321 and 322 with the run-in and framing bytes repeated in lines 321 and 322. The remaining 45 bytes in register 4, i.e. those broadcast in line 18, are clocked out in the same way as the first 45 and recorded as 17 bytes in each of lines 323, 324 and 325. It should be noted that the generated framing code need not be identical to the one broadcast. It may in some cases be preferable to use the inverse of the broadcast code to enable the teletext decoder to differentiate between direct broadcast and recorded teletext.

Clearly the invention relates to the processing of the teletext data and thereby involves the path it follows via components 1, 3, 4, 15 and 2; the details of the remaining components and circuitry would be evident to a competent television engineer.

Figure 2:
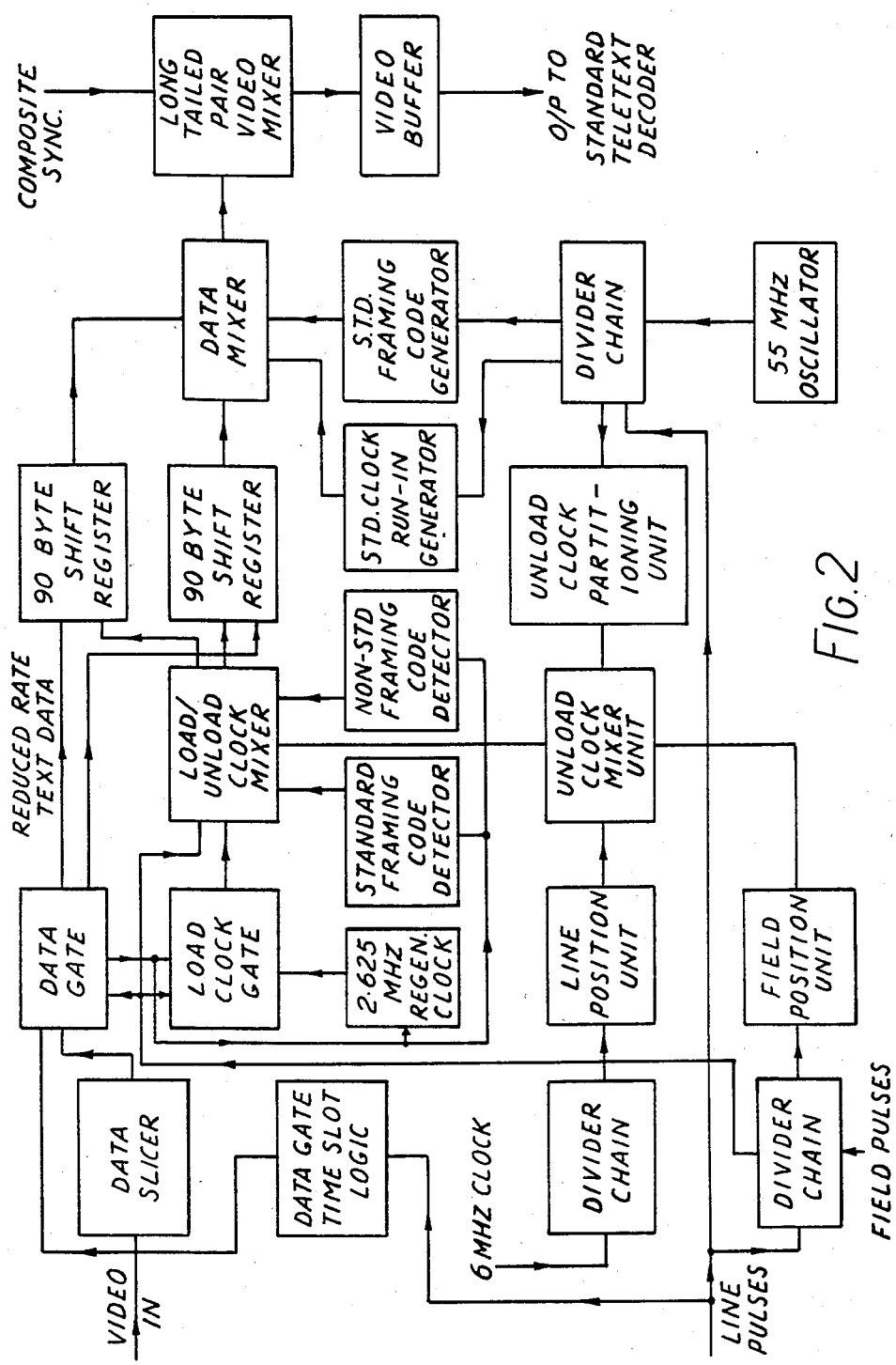
FIG. 2 is a block diagram of a data decoder.

The data replayed from the tape must be converted back to its original form viz 45 bytes/6.9375 MHz before it can be applied to a standard teletext decoder. The decoder for performing this conversion is shown in FIG. 2 and as it is almost identical to the encoder, much of its operation will be self evident. The data reproduced from the tape is clocked into the shift register at the low data rate i.e. 2.625 MHz during lines 320 to 325 and clocked out at the high data rate i.e. 6.9375 MHz, produced by dividing down the output from a 55 MHz oscillator. The clocking-in is inhibited while the run-in and framing bytes added to lines 321, 322, 324 and 325 are being read since it is not necessary to store these bytes. The normal run-in and framing bytes recorded in lines 320 and 323 may be stored and read out or alternatively may be generated in the decoder and mixed with the output data from the shift register.

The described embodiment relates to the recording of television text as broadcast according to the present United Kingdom standards. Clearly some modification may be necessary when designing an embodiment of the invention to be compatible with text broadcasting according to different standards; such modification as appropriate would be evident to a competent television engineer.

By providing additional shift register storage it is possible to receive and record more than two teletext rows per field e.g. with two 90 byte shift registers 4 teletext rows can be received per field and recorded in 12 lines of the next field.

The invention is not limited to the recording of broadcast teletext or to the use of magnetic recording. It may be used to record any data which is required to be reproduced at a rate beyond the capability of the recording medium and is applicable to video discs as well as video tape.

I claim:

1. Video recording equipment comprising:
   means to receive a composite signal having standard video information and teletext data, the teletext data occupying a predetermined number A of television line periods in the field blanking period of the standard video information;
   a signal encoder;
   means in the encoder, to separate out teletext data from a received composite signal;
   means, in the encoder, to reduce the rate of the teletext data from its value at the reception means;
   adding means, in the encoder, to combine the output of the receiving means and the output of the rate-reducing means in order to insert the reduced rate teletext data in a number, corresponding to $N \times A$ (where $N > 1$), of line periods in the field blanking period of the composite signal;
   means to record the combined signal output from the mixing means.

2. Video recording equipment according to claim 1, wherein the rate-reducing means comprises storage means with clocking means to effect output from the storage means at a rate less than that of input.

3. Video recording equipment according to claim 1, wherein the rate-reducing means effects a reduction to a value such that the teletext data rate in the composite is an integral multiple of the reduced value.

4. Video display equipment comprising:
   means to derive, from a recording, a combined signal having standard video information and teletext data, the teletext data occupying a predetermined number A of television line periods in the field blanking period of the standard video information and the teletext data being at a rate reduced in comparison to the rate of broadcast-teletext;
   a signal decoder;
   means, in the decoder, to separate out the teletext data from the combined signal;
   means, in the decoder, to increase the rate of the teletext data to a value substantially corresponding to that of broadcast-teletext;
   adding means, in the decoder, to combine the output of the derivation means and the output of the rate increasing means in order to insert the teletext data, which is at broadcast rate, in a number, corresponding to $N \times A$ (where $N > 1$), of line periods in the field blanking period of the combined signal, thereby to form a composite signal; and
   means to display the composite signal.

5. Video display equipment according to claim 4, wherein the rate-increasing means comprises storage means with clocking means to effect output from the storage means at a rate greater than that of input.

6. Video display equipment according to claim 4, wherein the rate-increasing means effects an increase to a value corresponding to an integral multiple of the teletext data rate of the recording.

7. Video recording equipment comprising:
   means to receive, e.g. by broadcast, a composite signal having standard video information and teletext data, the teletext data occupying a predetermined number A of television line periods in the field blanking period of the standard video information;
   a signal encoder;
   means in the encoder, to separate out teletext data from a received composite signal;
   means, in the encoder, to reduce the rate of the teletext data from its value at the reception means;
   adding means, in the encoder, to combine the output of the receiving means and the output of the rate-reducing means in order to insert the reduced rate teletext data in a number, corresponding to $N \times A$ (where $N > 1$), of line periods in the field blanking period of the composite signal;
   means to record the combined signal output from the mixing means;
   means to playback a recording of a combined signal having standard video information and teletext data, the teletext data occupying a predetermined number A of television line perods in the field blanking period of the standard video information and the teletext data being at a rate reduced in comparison to the rate of broadcast-teletext;
   a signal decoder;
   means, in the decoder, to separate out the teletext data from the combined signal;
   means, in the decoder, to increase the rate of the teletext data to a value substantially corresponding to that of broadcast-teletext;
   adding means, in the decoder, to combine the output of the derivation means and the output of the rate-increasing means in order to insert the teletext data, which is at broadcast rate, in a number, corresponding to $N \times A$ (where $N > 1$), of line periods in the field blanking period of the combined signal thereby to form a composite signal for display.

* * * * *